United States Patent [19]

Wu et al.

[11] Patent Number: 4,839,886
[45] Date of Patent: Jun. 13, 1989

[54] STAR CONFIGURED LOCAL AREA NETWORK HAVING PRIORITY ALLOCATION

[75] Inventors: Ming-Daang Wu, Raleigh, N.C.; Charles J. Intrieri, Jr., Lewisberry, Pa.

[73] Assignee: E. I. Du Pont De Nemours and Company, Wilmington, Del.

[21] Appl. No.: 65,229

[22] Filed: Jun. 22, 1987

[51] Int. Cl.$^4$ .............................................. H04B 9/00
[52] U.S. Cl. ........................................ 370/4; 370/85; 340/825.02; 340/825.5; 455/601; 455/607; 375/3
[58] Field of Search ............... 375/3, 4; 455/601, 600, 455/607, 612; 370/4, 85, 94, 60; 340/825.5, 825.02, 825.08, 825.51

[56] References Cited

U.S. PATENT DOCUMENTS

| | | | |
|---|---|---|---|
| 4,072,399 | 2/1978 | Love | 350/96.16 |
| 4,090,067 | 5/1978 | Bell et al. | 455/601 |
| 4,227,260 | 10/1980 | Vojvodich et al. | 455/601 |
| 4,386,821 | 6/1983 | Simon et al. | 350/96.2 |
| 4,408,353 | 10/1983 | Bowen et al. | 455/601 |
| 4,511,208 | 4/1985 | Ozeki et al. | 350/96.16 |
| 4,568,931 | 2/1986 | Biolley et al. | 370/4 |
| 4,641,373 | 2/1987 | Shutterly | 455/601 |
| 4,716,408 | 12/1987 | O'Connor et al. | 340/825.5 |

OTHER PUBLICATIONS

Graf; Modern Dictionary of Electronics; Sams & Co, Inc; Indiana, USA; 1977; p. 144.
Jones; IBM Demonstrates Ring Proposed as LAN Standard; "Mini–Micro Systems"; Jan. 1984; pp. 31–33.
David Ushijima, "Inside Apple Talk", Byte Magazine, Jun. 1985, pp. 185–200.
Reese Jones, "Apple Talk for the Rest of Us", Berkeley MacIntosh Users Group Newsletter, Fall 1985, pp. 75–76.
Reese Jones, "Installing a PhoneNET Network", pp. 43–46, Berkeley MacIntosh Users Group Newsletter, Spring 1986.
P. K. Runge and S. S. Cheng, "Demountable Single-Fiber Optic Connectors and Their Measurement on Location", The Bell System Technical Journal, vol. 56, No. 6, Jul.–Aug. 1978, pp. 1771–1773.

Primary Examiner—Robert L. Griffin
Assistant Examiner—Andrew J. Telesz, Jr.

[57] ABSTRACT

An electronic device for a local area network of electronic apparatuses is characterized by a timer operatively associated with each apparatus, each timer being retriggerably responsive to the occurrence of a periodic feature of a code to assert a line driver for the period of the timer. The period of the timer is greater than the period of the feature. A priority allocation arrangement is connected such that the assertion of a given timer disables the other timers.

3 Claims, 5 Drawing Sheets

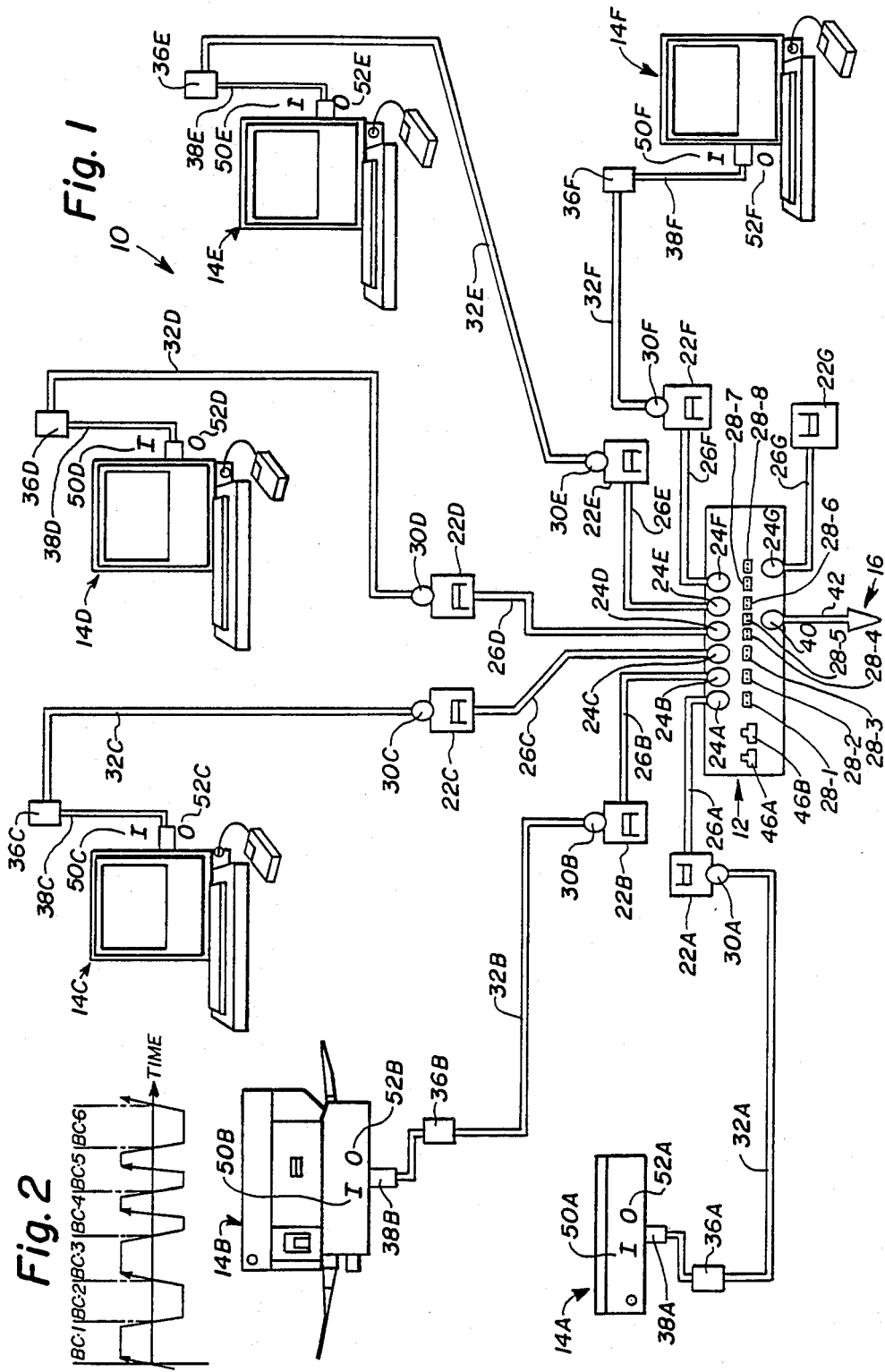

STAR CONFIGURED LOCAL AREA NETWORK HAVING PRIORITY ALLOCATION

CROSS REFERENCE TO RELATED APPLICATION

Subject matter disclosed herein is also disclosed in the copending application Ser. No. 065,234, filed June 22, 1987 (EL-4277), assigned to the assignee of the present invention.

BACKGROUND OF THE INVENTION

1. FIELD OF THE INVENTION

The present invention relates to an electronic device apparatus for a local area electronic communications network having a priority allocation arrangement.

2. DESCRIPTION OF THE PRIOR ART

When multiple electronic apparatuses, whether they be computers, peripherals or servers, are interconnected in a series, or "daisy-chain", form of local area communications network the possibility exists that the failure of one of the interconnected apparatuses would result in an opening in the network and would thus incapacitate the network. An alternative form of local area network interconnection is known as the "star" configuration. In the star configuration all connections to the apparatuses interconnected into the network emanate from a central node. There is known in the art an electronic device which provides multiple connections to support multiple electronic apparatuses in a star configuration. Solely for purposes for this application, such an electronic device shall be referred to as a "concentrator", although such usage should not be confused with that term as the same is defined in Graf: Modern Dictionary of Electronics; Sams and Co, Inc.; Indiana, USA: 1977; pp. 144. As an advantage of the star configuration the possibility that the malfunction of a given one of the electronic apparatuses will result in the incapacity of the entire network is precluded.

Once they are interconnected the linked apparatuses communicate with each other over the network using some form of bit encoding scheme. One common form of coding is a frequency modulation scheme known as "FM(O)" modulation. This technique subdivides a data stream into "cells", or bit times, with the occurrence or absence of a signal transition during the bit time denoting a predetermined binary digit. The encoding scheme is such that some predetermined signal feature, such as a transition of a waveform, will occur at some recurrence rate. For example, in the instance of an FM(O) modulation scheme a rising edge will occur at least once during the time period T that encompasses two bit times. The FM(O) modulation scheme is discussed in the article "Inside Appletalk", Byte magazine, June 1985, pages 195 to 200, at pages 190 to 192.

It is believed to be advantageous to provide an arrangement to impart a degree of priority allocation for the use of such an electronic device among the various electronic apparatuses connected in the network.

SUMMARY OF THE INVENTION

The present invention relates to an electronic device for a local area network interconnecting a plurality of electronic apparatuses in a star configuration. At least one of the electronic apparatuses is of the type that is able to transmit a data stream in accordance with a code that has a repetitive feature with periodicity of at least a time T. Each electronic apparatus has a data output port and a data input port associated therewith.

The present invention is useful with an electronic device of the type that includes an interface connected to each electronic apparatus, the interface having a transmit and a receive port respectively connected to the input and the output ports of the electronic apparatus. In the instance in which the physical link between the interconnected apparatuses in the local area network operates using fiber optic technology there is provided a suitable transducer between the electronic apparatus and the interface with which it is associated to convert a signal from an electrical to a corresponding optical form, and vice versa.

The electronic device also includes a line driver having an input port which is connected to the receive port of each interface and an output port which is connected to the transmit port of each interface. The line driver has an enable terminal provided therein which asserts the line driver so long as an enabling signal is applied thereto. A timer is connected between the receive port of each interface and the enable terminal of the line driver. The timer has a predetermined period that is equal to the time period T plus some additional time increment "Delta". The timer is retriggerably responsive to the occurrence of the predetermined feature of the code to generate an enable signal that is applied to the line driver device to assert the same for the period of the timer.

In accordance with the present invention a priority allocation arrangement is provided in which each of the other timers is responsive to the enable signal generated by a given timer to temporarily disable those other timers from operating for the time during which the given timer is asserted. Thus a degree of priority allocation is imparted for the use of the electronic device among the various electronic apparatuses.

BRIEF DESCRIPTION OF THE DRAWINGS

The invention will be more fully understood from the following detailed description thereof taken in connection with the accompanying drawings which form a part of this application and in which:

FIG. 1 is a highly stylized pictorial representation of a local area network connected in a star configuration using an electronic device in accordance with the teachings of the present invention;

FIG. 2 is a timing diagram illustrating an example of the FM(O) bit encoding scheme.

DETAILED DESCRIPTION OF THE INVENTION

Figure 3A:
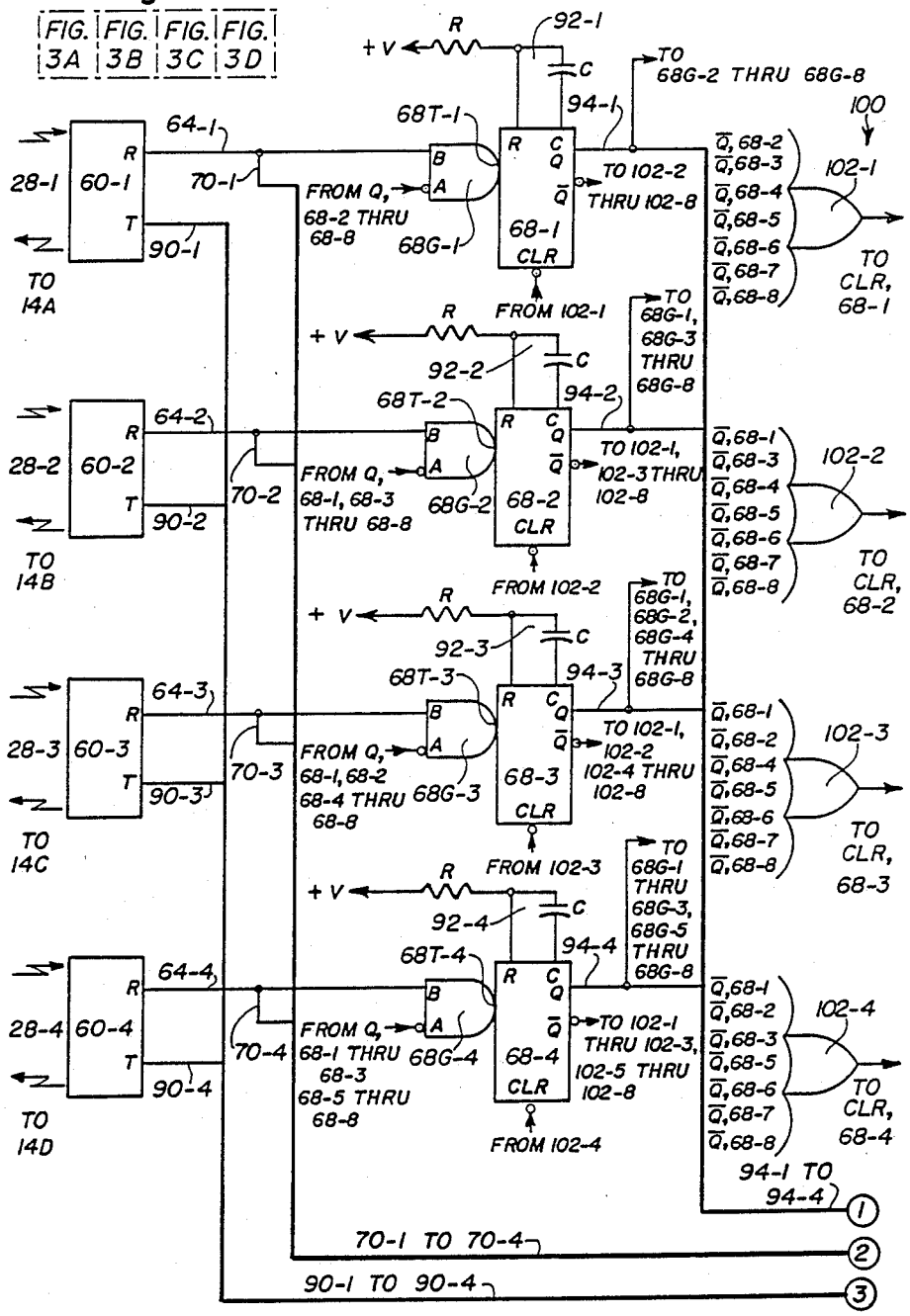
FIGS. 3A and 3D cooperate to form a detailed schematic diagram of the electronic device in accordance with the present invention.

Throughout the following detailed description similar reference numerals refer to similar elements in all figures of the drawings.

With reference to FIG. 1 shown is a highly stylized pictorial representation of a local area network generally indicated by reference character 10. The network 10 includes an electronic device, referred to in the remainder of this description as a concentrator device 12 with which the priority allocation arrangement in accordance with the present invention may be used. The concentrator 12 is used to interconnect a plurality of electronic apparatuses 14A through 14F into a star configuration. The concentrator 12 may itself be connected by a stub 16 to other electronic apparatus or apparatuses over a suitable bus interconnection (not shown). The concentrator 12 may also be connected to additional concentrators over the stub 16 to form a cascade arrangement and thus increase the capacity of the network in terms of the number of electronic apparatuses serviced thereby.

The electronic apparatuses used in the network 10 may typically take the form of digital computers or peripheral electronic apparatus such as file servers, printers, or the like. For example, as seen in FIG. 1 the network 10 may include a file server 14A, a printer 14B, and a plurality of digital computers arranged as individual workstations 14C through 14F. Each digital computer located at each of the workstations is preferably implemented by a Macintosh computer sold by Apple Computer Company, Cupertino, California, although it should be understood that any suitable device may be used.

The concentrator 12 is arranged to service, from a central location such as a wiring closet, a plurality of wall sockets 22A through 22G. Each of the sockets 22 is linked via a plug 24 and a suitable run 26 of cable to one of an array of receptacles 28 provided on the concentrator 12. In the preferred case the cable run 26 is a fiber optic cable. Each of the sockets 22 may be connected to a given one of the electronic apparatuses 14 via a link comprising a plug 30 and a run 32 of cable. As will be discussed herein in the preferred implementation each apparatus 14A through 14F communicates with the concentrator 12 over a fiber optic link. To achieve this end a converter 36 is connected to each individual apparatus 14 over a suitable electrical line 38, such as a twisted pair or a coaxial cable. Each converter 36 is also connected to the cable run 32. The converter 36 is preferably the device sold by the Interconnect and Packaging Division of E. I. Du Pont de Nemours and Company, Inc. as model number 79030 and includes a transducer identified as model AN 1500A. However, it should be understood that the converter could include any suitable transducer operative to convert signals in electrical form to optical form and vice versa.

The stub connection 16 whereby the concentrator is connected to the bus may be implemented by a plug 40 and a cable run 42. The plug 40 is received in one of the receptacles 28 provided on the concentrator 12. The run 42 is preferably fiber optic cable.

Whatever the nature of the particular electronic apparatuses 14A through 14F utilized and whatever medium of signal transmission relied upon each of the electronic apparatuses includes a data output port and a data input port respectively diagrammatically indicated by reference characters 50 and 52. The electronic apparatuses 14A through 14F are adapted to transmit data in accordance with any known encoding scheme so long as that encoding scheme includes some recurring feature having a periodicity of a time T. Preferably the data encoding scheme is that frequency modulating technique known as the FM(O) scheme.

FIG. 2 is a timing diagram of a data stream encoded using the FM(O) scheme. In this scheme the data stream is subdivided into units of time known as "cells" and the data signal present at the output port 50 of the electronic apparatus changes state at the end of each cell. The presence or absence of a transition during the cell carries information representative of a predetermined binary digit. As an example, as seen in FIG. 2, six cells BC-1 through BC-6 are shown. No signal transition occurs during the cells BC-1, BC-2, BC-3 and BC-6. The signal during each of these cells may thus, for example, be assigned a binary "1" value. In the cells BC-4 and BC-5, however, the signal transitions. The binary value "0" is thus assigned to the signals during these cells. From the foregoing discussion it may be seen that in such a scheme a predetermined feature, such as a rising edge of a waveform (indicated by the arrowhead in the waveform of FIG. 2) is guaranteed to occur at least once during every two bit cell times. This feature has a periodicity of a time T having a maximum duration of two bit cell times.

With reference now to FIG. 3 shown is a detailed schematic diagram of the concentrator device 12 with which the priority allocation arrangement of the present invention may be used. The concentrator 12 is configured for use in a fiber optic implementation of a local area network. In some instances it is desirable in a local area network 10 of the star configuration that a transmission of data originating from any one of the electronic apparatuses 14A through 14F be received by each of the other electronic apparatuses in the star configuration. The concentrator 12 in accordance with the present invention provides this function.

Concentrator 12 includes a plurality of interfaces 60-1 through 60-8. Each interface 60 is associated with one of the receptacles 28. Each interface 60 is connected to one of the fiber optic data links comprising the fiber optic cable run 26, the socket 22, the plug 30, the fiber optic cable run 32, and the converter 36 emanating from each electronic apparatus 14. One of the interfaces 60 may be connected to the plug 40 and the fiber optic cable 42 both of which form the stub 16. Thus, as seen in FIG. 3, the interfaces 60-1 through 60-4 are respectively associated with the electronic apparatuses 14A through 14D connected at the corresponding receptacles 28 and sockets 22. The interface 60-5 is connected to the stub 16. The interfaces 60-6 and 60-7 are respectively connected to the apparatuses 14E and 14F. The interface 60-8 is connected to the socket 22G, shown as unused in the network of FIG. 1. Each interface 60 may be suitably implemented by a device similar to that used to implement the converters 36. Each interface 60 includes a transducer to convert signals in electrical form to optical form and vice versa.

Each interface 60 has a transmit port T and a receive port R associated therewith. The transmit port of each interface 60 is connected to the data input port 50 of the associated electronic apparatus 14 while the receive port of each interface 60 is connected to the data output port 52 of the associated electronic apparatus 14. The receive port of each interface 60 is connected over a line 64 to the trigger pin 68T of a timer 68 and over a line 70 to one of the data input terminals of a line driver 74. The line driver device such as that manufactured and sold by Texas Instruments under model number SN75151 may be suitable for use as the line driver 74. Perhaps a more preferable line driver is that device manufactured and sold by Texas Instruments as model number SN75172, since this driver is compatible with parallel outputs, as will be discussed. The pairs of differential output lines 78 from the line driver 74 are connected via a differential but 80 to an amplifier 84, such as a device sold by Texas Instruments as model number 9637A. The output of the amplifier 84 is applied over lines 86 to the input terminals of each one of an array of gates 88. Suitable for use as the gates 88 are devices manufactured and sold by Motorola under the model number LS02. The output of the gates 88 is connected via a line 90 to the transmit terminals of the associated interfaces 60.

The timer 68 may, in the preferred case, be implemented by a retriggerable monostable multivibrator or "one-shot" such as the device manufactured by Texas Instruments and sold under model number LS123. In the embodiment of the invention illustrated in FIG. 3 each timer 68 is shown to include a gate 68G that buffers the trigger terminal 68T thereof. The gate 68G is held normally open by connecting the control terminal thereof (the "A" terminal) to an appropriate potential. When so connected the output from an interface 60 on the associated line 64 is gated to the trigger of the associated timer 68. Each timer 68 is connected to an RC network 92 the time constant of which is selected in accordance with the periodicity T of the feature of the coding scheme used by the apparatuses 14. Preferably the values of the resistance and capacitance of the network 92 are selected such that a time constant of the timer 68 has a period equal to the time T plus some offset time "Delta". Any convenient offset time may be used. The period of the timer 68 is longer than the maximum period of the recurring feature.

One of the output terminals, e.g., the Q output terminal from each of the timers 68, is connected over a line 94 to the enable pin of the line driver 74. The signal from the output terminal 68Q of each of the timers 68 is also connected over a line 96 to the control terminal of an associated one of the gates 88.

Figure 3B:
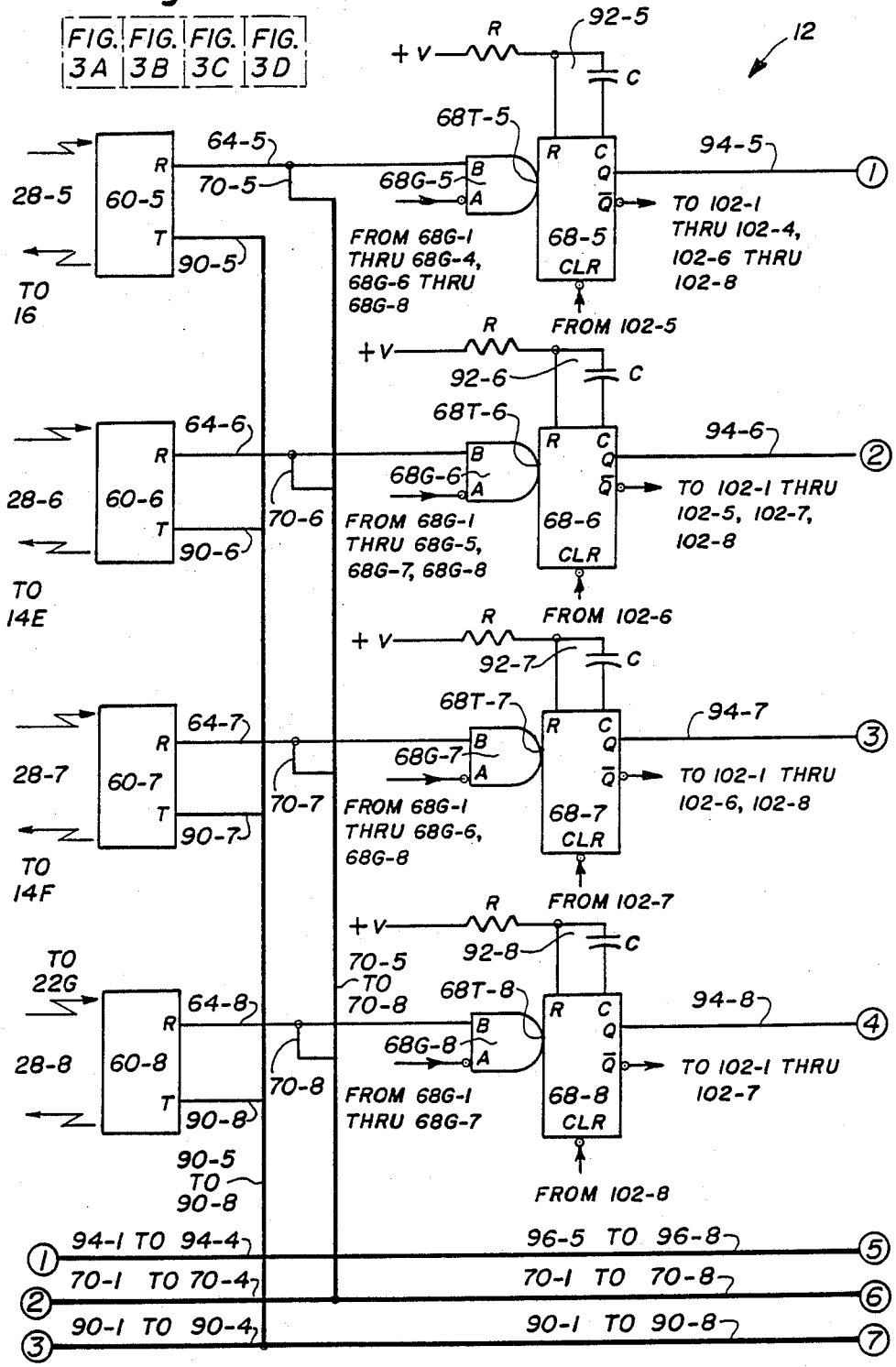
Figure 3C:
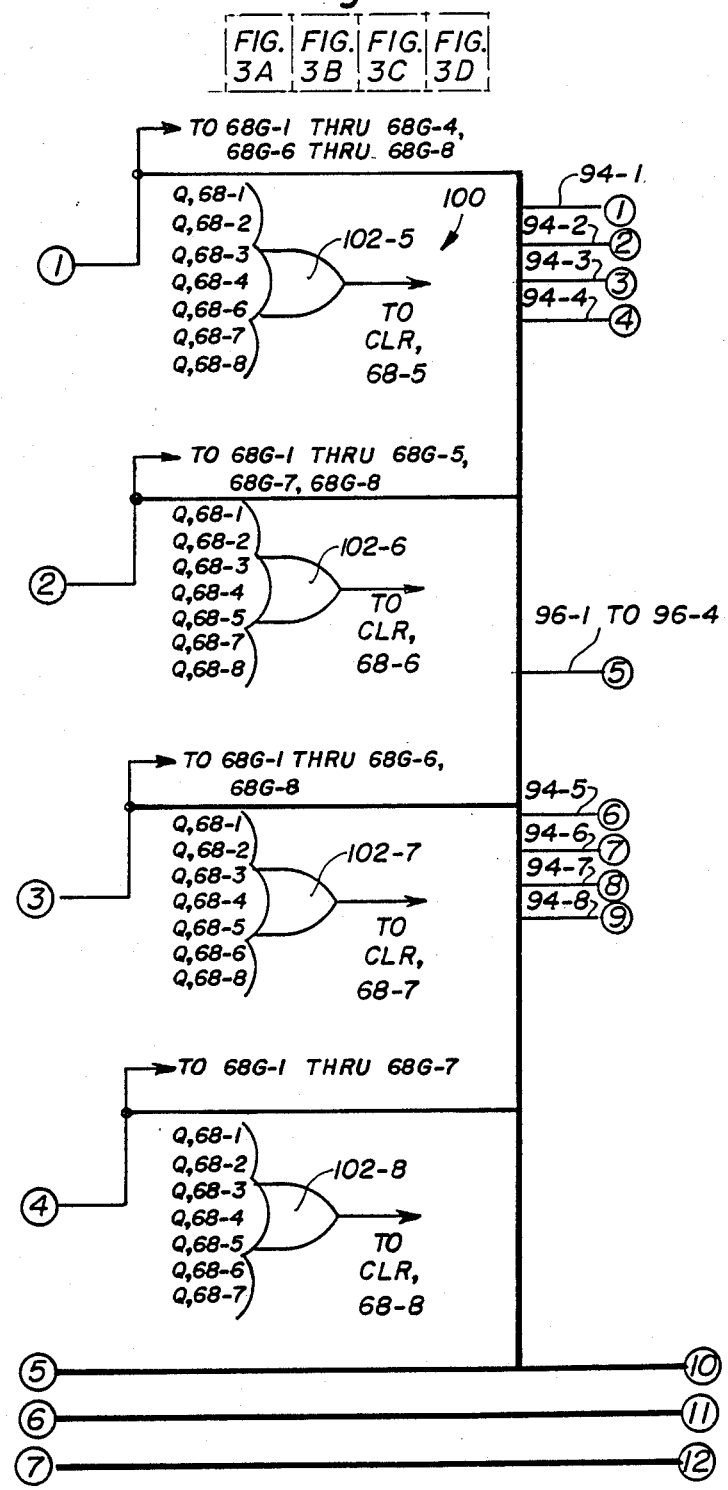
Figure 3D:
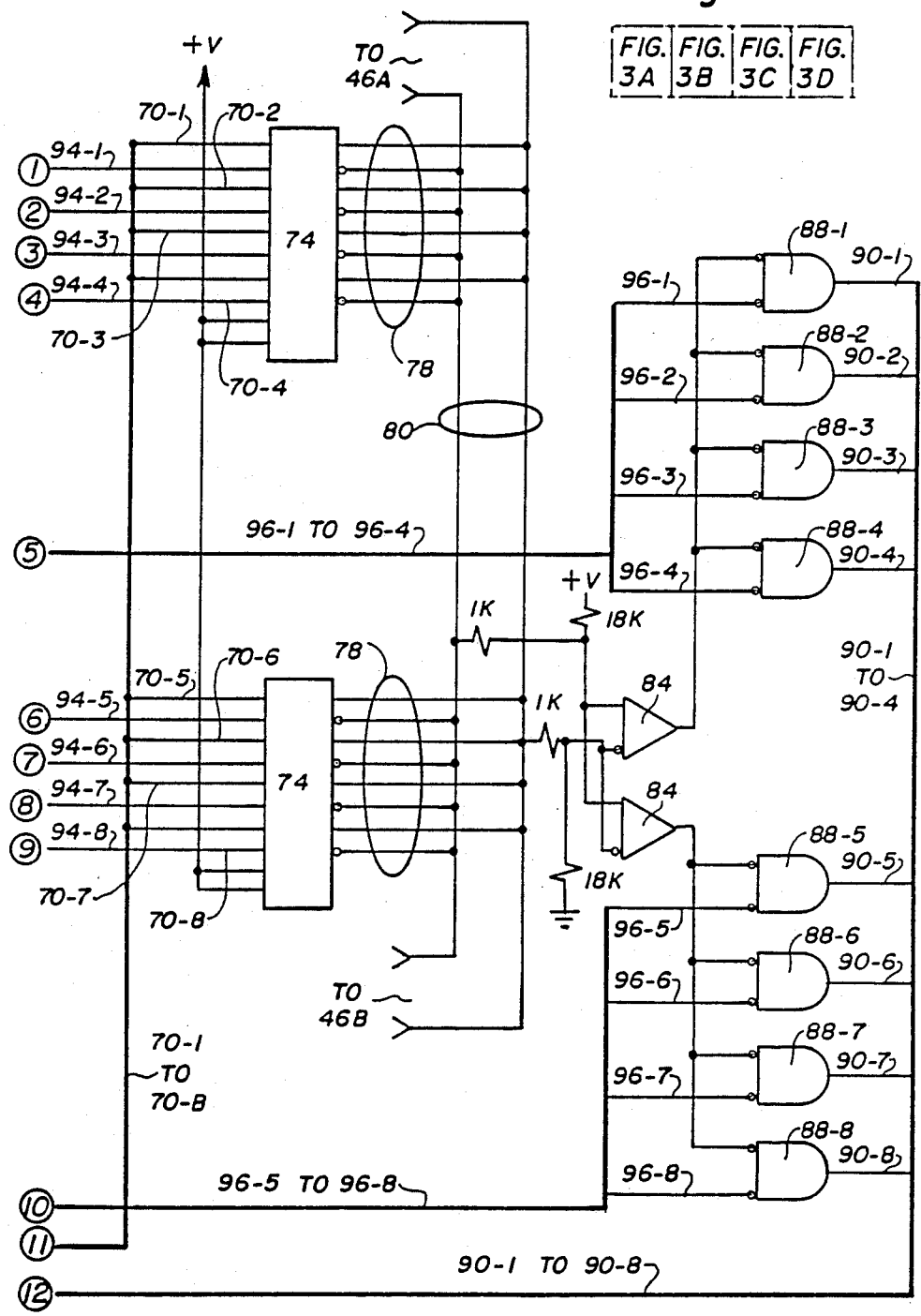

In addition, in accordance with the present invention an allocation arrangement generally indicated by reference character 100 is used to provide a degree of priority allocation for the use of the concentrator 12 among the various electronic apparatuses of the network 10. In accordance with one embodiment the complementary Q-NOT output terminal of each one of the timers 68 is connected via an array of multi-input OR-gates 102-1 through 102-8 to the CLEAR terminal of all of the other timers 68, as is seen in FIGS. 3B and 3C. In accordance with an alternate embodiment of this invention the Q output from each one of the timers 68 may be connected to the control terminal (the "A" terminal) of the gate 68G of all of the other timers for the same purpose of priority allocation as is also illustrated in FIGS. 3B and 3C. If additional concentrators are cascaded some expedient must be provided to interconnect all timers 68 in the cascaded concentrator array in the manner selected to effect priority allocation (i.e., Q-NOT terminal of one given timer to CLEAR terminal of all other timers; Q terminal of a given timer to control terminal (the "A" terminal) of the gate 68G of all other timers). By "priority allocation" it is meant that these arrangements are effective to use the enable signal generated by a given timer to disable the other timers while the asserted timer produces the enable signal. These arrangements are most effective when a transmission from one apparatus 14 precedes the transmission from another apparatus but may not be totally effective when the transmissions are exactly simultaneous. In addition it should be understood that suitable circuitry may be necessary such that, upon power-up, appropriate initial conditions for the concentrator be exhibited including a logic low at the control inputs of the gates 68G.

The differential output bus 80 from the line drivers 74 is connected to the receptacles 46 of the concentrator 12. Thus additional concentrators may be cascaded using an electrical cable to increase the capacity of the network 10 in terms of the number of electronic apparatuses 14 capable of being serviced thereby. It should be noted that the receptacles 46 could also be used to connect over an electrical cable to other electronic apparatuses 14.

In operation, a message originating at the output port 52 of any one of the electronic apparatuses 14 is applied over its link (whether fiber optic or electrical) to the associated interface 60. At the first occurrence of the predetermined feature of the message from the apparatus 14 (e.g., the rising edge of a waveform as shown in FIG. 2) the one-shot timer 68 is triggered by the signal on the line 64 from the interface 60 associated with the electronic apparatus. The one-shot timer 68 responds to the occurrence of the predetermined feature (e.g., the rising edge) in the encoded message to produce an enabling signal on the line 94 which is applied to the corresponding enable pin of its associated line driver 74. Contemporaneously the same output line 94 from the enabled timer 68 is applied over the line 96 to disable the associated gate in the gate array 88. The line driver 74 remains asserted for the duration of the period (T plus "Delta") of the timer 68. However, since the period of the timer 68 is selected so as to be related to the periodicity of the recurring feature of the encoding scheme used by the electronic apparatus 14, as long as the message is being output from the particular electronic apparatus 14 the oneshot timer 68 is being periodically retriggered at each reoccurrence of the predetermined feature of the code. Thus, the encoding of the message serves continually to retrigger the timer 68 and thus to assert the driver 74 and to disable the associated one of the gates 88.

In addition, since, in one embodiment, the complementary Q-NOT output of the triggered timer is applied via the appropriate gate 102 to the CLEAR terminal of all of the other timers in the concentrator (and cascaded concentrators), each of these other timers is disabled for the duration of the operation of the given timer. In an alternate embodiment, since the Q output of the triggered timer is applied to the control terminal (the "A" terminal) of the gates 68G of all the other timers in the concentrator (and cascaded concentrators), each of these other timers is likewise disabled for the duration of the operation of the given timer. Each embodiment of the present invention thus includes means responsive to the enable signal generated by a given one of the timers for disabling all of the other timers for the period during which the given timer produces the enable signal. In either embodiment a degree of priority or dedication of the concentrator is thus afforded to the electronic apparatus whose message is first applied to the concentrator. In this manner collisions may be avoided. It is noted that the electronic apparatuses 14 may themselves be provided with collision avoidance software routines.

When the message is ended the given timer 68 is permitted to time out due to the absence of the feature of the code. Thus, the interrelationship of the period of the timer 68 with the periodicity of a recurring feature of the code used in the encoding scheme of the electronic apparatus 14 guarantees that the concentrator 12 is asserted for the duration of the message output from the apparatus 14. In this manner a transmission from any of the associated electronic apparatuses in the local network 10 (or in the network connected to the concentrator via the stub 16 or the receptacles 46) will be broadcast to all of the other electronic apparatuses 14 in the network. The collision avoidance arrangement discussed prevents the broadcast of a message from another apparatus 14 during this time.

Those skilled in the art having the benefit of the teachings of the present invention as hereinabove set forth may effect numerous modifications thereto. These modifications are to be construed as lying within the scope of the present invention as defined in the appended claims.

What is claimed is:

1. An electronic device for a local area network interconnecting a plurality of electronic apparatuses in a star configuration, at least one of the electronic apparatuses being of the type that is able to transmit a data stream in accordance with a code having a repetitive feature with a periodicity of at least a time T, each electronic apparatus having a data output and data input port associated therewith, the electronic device comprising:

an interface connected to each electronic apparatus, the interface having transmit and receive ports respectively connected to the input and output ports of the electronic apparatus;

a line driver having an input which is connected to the receive port of each interface and an output which is connected to the transmit port of each of the interfaces, the line driver having an enable terminal;

a timer connected to the receive port of each interface, each timer having an output connected to the enable terminal of the line driver;

each timer having a predetermined period that is equal to a time T plus an offset time "Delta", each timer being retriggerably responsive to each occurrence of the feature of the code to generate an enable signal that is applied to the line driver to assert the same, for the period of each timer; and means responsive to the enable signal generated by a given one of the timers for disabling the other timers for the period during which the given timer produces the enable signal.

2. The electronic device of claim 1 wherein each timer includes a Q output and a control terminal, wherein the disabling means comprises the interconnection of the Q output of each timer to the control terminal of all of the other timers, the enable signal to the line driver being derived from the Q output of each timer.

3. The electronic device of claim 1 wherein each timer includes a Q output, a Q-NOT output and a CLEAR terminal, wherein the disabling means comprises the interconnection of the Q-NOT output of each timer to the CLEAR terminal of all of the other timers, the enable signal to the line driver being derived from the Q output of each timer.

* * * * *